June 11, 1968  J. K. MATES ET AL  3,387,341
FASTENING DEVICE
Filed June 2, 1967

INVENTORS
JACK K. MATES
PARDEE P. STANOS
BY Pennie, Edmonds, Morton, Taylor & Adams
ATTORNEYS

United States Patent Office 3,387,341
Patented June 11, 1968

3,387,341
FASTENING DEVICE
Jack K. Mates, Scarsdale, N.Y., and Pardee Peter Stanos, Youngstown, Ohio; said Mates assignor to American Velcro, Inc., New York, N.Y., a corporation of New Hampshire
Filed June 2, 1967, Ser. No. 643,255
6 Claims. (Cl. 24—73)

ABSTRACT OF THE DISCLOSURE

A fastening device for releasably securing an instrument to a supporting surface including a sleeve-like adaptor which can be removably mounted on the instrument and tape means on the adaptor including hook-like burr elements on its surface for releasably securing the device to hook-like elements on the supporting surface.

Background of the invention (1) *Field of the invention.*—This invention relates to a fastening device for releasably securing an instrument to a supporting surface. More particularly this invention relates to a fastening device which may be secured on an instrument and be used thereafter in connection with other instruments and which employs hook and loop fasteners to releasably secure the instrument to the supporting surface.

(2) *Description of the prior art.*—Many devices have been created to solve the troublesome problem of making accessible hand instruments which are used repeatedly in a set location. The most common example is that of ordinary writing instruments which commonly are misplaced or lost no matter what precautions are taken. Prior attempts at solving this problem include the use of chains and magnets. Chains are unsatisfactory for general use because the degree of freedom to write is usually impaired, and magnets are unsatisfactory because they severely limit usefulness to those applications where the instrument may be constructed of or adapted to magnetic material, such as use with metallic instruments.

Summary of the invention

The fastening adaptor of the present invention is mountable on a member for releasably securing it to a supporting surface defined by a plurality of hooking elements. The device comprises a resilient, generally tubular shaped member which has an inner surface configuration defining a smaller opening dimension than the maximum dimension of the member to which it is to be attached. The outer surface of the tubular member is provided with a plurality of hooking elements which are interengageable with the hooking elements on the supporting surface. Certain of the hooking elements comprise hooks and certain of the hooking elements comprise loops which are characterized by the property that pressing opposed surfaces of the hooking elements together in face-to-face relationship will result in a large number of hooks engaging a large number of loops to hold the member to the surface.

The present invention utilizes hook and loop fasteners such as those described in U.S. Patents 2,717,437 and 3,009,235 which include separable members each comprising a sheet of woven fabric having raised threads of synthetic material wherein the loops of one tape member are cut at their outer extremities to form hooks but the loops of the other tape member remain uncut. It is also contemplated that a given member may comprise both hooks and loops.

Where the two members of the fasteners are pressed together in face-to-face relationship, there is substantial engagement of hook threads with the loop threads. A considerable effort must be applied to separate the members unless they are peeled apart. In that event the members may be separated quite easily.

The present invention has a versatility that is not approached in the prior art. Aside from its apparent use with writing instruments, the present fastening device can be used in the home as a toothbrush holder and employed in hospitals to hold thermometers. The present fastening device makes an ideal toothbrush holder because its hook and loop fasteners are unaffected by moisture; since the adaptor is releasably secured, it may be reused after the first toothbrush has been discarded. As a thermometer holder, it allows easy access to a fragile instrument and makes possible safe storage thereof. When the thermometer is to be sterilized, the adaptor either may be removed or placed in the autoclave. The adaptor can be used to retain papers by securing them in the longitudinal slit of the body member. Many other uses are possible such as in connection with kitchen implements or work shop tools such as screwdrivers or hammers.

Description of the preferred embodiment

Figure 1:
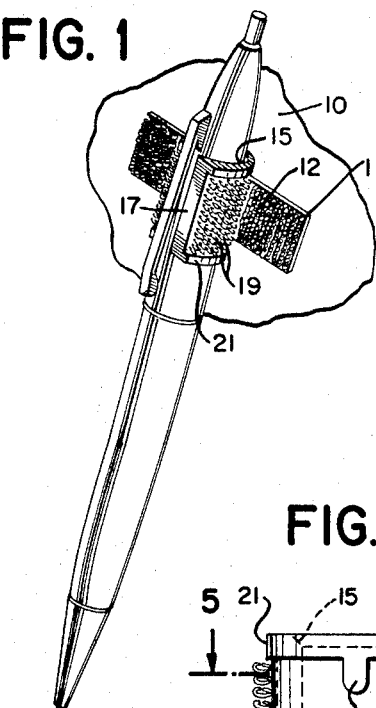
FIG. 1 is a perspective view of the fastening device of the present invention.
Figure 2:
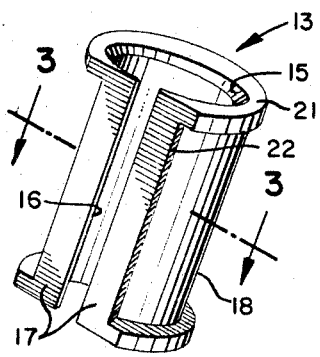
FIG. 2 is a perspective view of the adaptor of the present invention.
Figure 3:
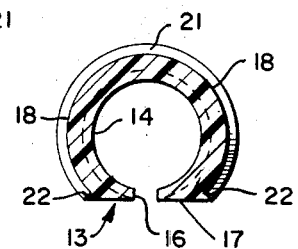
FIG. 3 is a section taken substantially along line 3—3 of FIG. 2.
Figure 4:
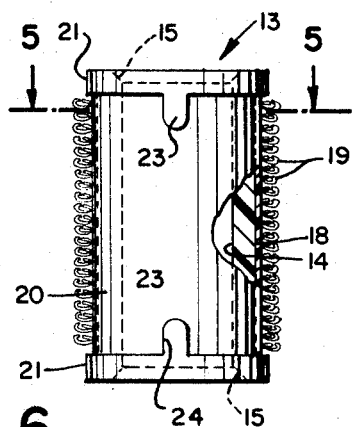
FIG. 4 is an elevation of the adaptor.
Figure 5:
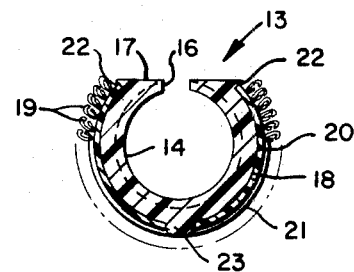
FIG. 5 is a section taken substantially along line 5—5 of FIG. 4.

Referring initially to FIG. 1, the present invention includes a support 10 the surface of which is defined by a plurality of upstanding hooking elements 11 which are raised loop threads of synthetic material such as super polyamide. The hooking elements 11 may be closed loops as shown in the present embodiment or may be cut at their outer extremities to form hooks. Usually the hooking elements 11 are formed integrally in a sheet of woven fabric tape 12. The tape 12 may be secured to almost any surface by adhesive or other suitable means.

Figure 6:
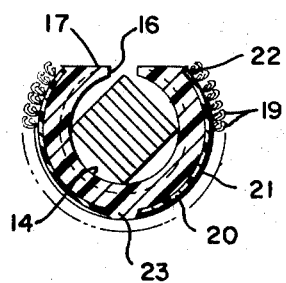
FIG. 6 is a sectional view of the adaptor and an instrument retained therein.
Figure 7:
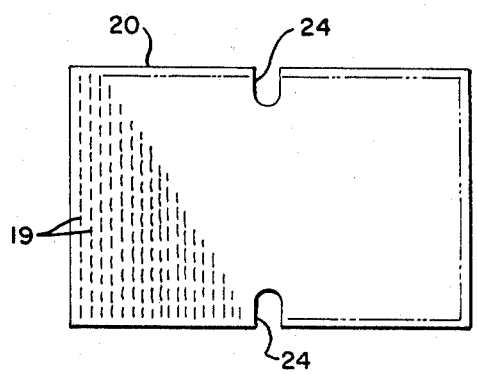
FIG. 7 is a plan view of the tape member before application to the surface of the adaptor.

Referring now to FIGS. 2–5, the present fastening device further includes an adaptor ring 13 which is preferably made of high impact styrene plastic but which may be made of metal or other suitable material. The adaptor ring 13 is preferably formed by injection molding. The ring 13 has an inner surface 14 which is preferably cylindrical since this configuration lends itself to adaptation of most instruments as shown in FIG. 6. The inner surface cross-section is slightly smaller than the instrument so that it can be force fitted thereon. For example, the adaptor ring 13 is suitable for retaining instruments of circular cross-section such as pens or pencils, instruments of rectangular or square cross-section such as toothbrushes and instruments of triangular cross-section such as rectal or oral thermometers provided, of course, that the diameter of the inner surface 14 is less than the greatest dimension of the associated instrument to preserve its force-fitting features. It is further contemplated that the inner surface of the adaptor ring may be provided with an irregular cross-section such as a conical configuration which would allow usage with instruments of ranging diameters. Preferably, the inner surface 14 is beveled at edge portions 15. This construction eliminates sharp edges which could mar the associated instrument as the adaptor 13 is force fitted into place thereon.

The adaptor ring 13 has a longitudinal slit 16 thereby substantially defining a C-shaped cross-sectional configuration in the adaptor which allows it to function as a spring clamp. Therefore, when the adaptor ring 13 is force fitted on the associated instrument it spreads slightly and owing to the resilient nature of its material substantially surrounds and frictionally engages the instrument. Portions of the adaptor 13 adjacent each side of the longitudinal slit 16 define co-planar surfaces 17 which provide a flat on the generally cylindrical adaptor and which prevent rolling as would otherwise occur with a cylindrical outer configuration. These narrowed planar surfaces also facilitate placement of the adaptor 13 under a pen or pencil clip to lock the adaptor in place.

The outer surface 18 of the adaptor ring 13 is defined by a plurality of upstanding complementary hooking elements 19 which are raised loops of synthetic material such as super polyamide. The outer surface configuration need not be similar to that of the inner surface 14. In the present embodiment, the loops of the complementary hooking of elements 19 are cut at their outer extremities to form hooks. Most conveniently, the hooking elements 19 are integrally formed in a sheet of woven fabric tape 20. The tape 20 may be secured to the outer surface 18 of adaptor ring 13 by solvent activated or heat activated adhesive or other suitable means. As illustrated best in FIG. 4 the marginal end portions of the outer surface 18 are provided with radially upstanding flanges 21 which are of a height less than the height of the hooking elements 19 and the portions of the outer surface 18 adjacent the co-planar surfaces 17 are provided with shoulders 22. The purpose of the flanges 21 and the shoulders 22 is to define an annular channel in which the tape can be placed to prevent the marginal edges of the tape 20 from being peeled away from the outer surface 18. Also provided on the outer surface 18 integral with flanges 21 and substantially diametrically opposed to longitudinal slit 16 are inwardly extending projections 23 which mate with notches 24 in the tape 20 to assure the proper placement of the tape 20 during assembly.

The adaptor ring 13 in no way hampers the normal use of an instrument to which it is attached. When the associated instrument is to be stored, the complementary hooking elements 19 of adaptor ring 13 are brought firmly into face-to-face engagement with the hooking elements 11 of support 10 which results in a large number of hooking elements 11 engaging a large number of complementary hooking elements 19. The elements 11, 19 so engaged, resist separation but may be separated readily by a peeling force applied substantially normal to the interfacial plane of engagement. In the normal instance the support 10 will be affixed to a vertical surface and the force applied to the system by the weight of the instrument will be substantially parallel to the interface and have a very small normal component.

While hook type hooking elements 19 have been provided on the adaptor 13 and loop type hooking elements 11 have been provided on the support 10, it is intended that they may be interchanged and thus hooks could be provided on the support 10 and loops on the adaptor 13. In fact, it is contemplated that a given fabric tape surface could comprise both hook and loop type hooking elements.

We claim:
1. A fastening device comprising an adaptor and a supporting surface defined by a plurality of hooking elements, said adaptor mountable on a member for releasably securing the member to said supporting surface, the adaptor including a resilient generally tubular shaped member configured for force fitting on the member and a tape secured to the outer surface of the tubular member to provide a plurality of complementary hooking elements around the major circumference of the tubular member, said hooking elements on said supporting surface and said complementary hooking elements on said tubular member being interengageable and characterized by the property that pressing the outer surface of the adaptor and the supporting surface together in face-to-face relation will result in a large number of complementary hooking elements engaging a large number of hooking elements to releasably secure the member to the supporting surface.

2. A fastening device according to claim 1 wherein the tubular shaped member has a longitudinal slit along its entire length.

3. A fastening device according to claim 2 wherein the outer surface includes planar portions adjacent each side of the longitudinal slit and shoulders adjacent the planar portions of receiving the ends of said tape of the hooking elements.

4. A fastening adaptor according to claim 2 wherein the inner surface is generally cylindrical in configuration.

5. A fastening device according to claim 1 wherein the outer surface includes radially upstanding flanges at each marginal edge of a height less than the height of the hooking elements defining a channel therebetween to retain said tape.

6. A fastening adaptor according to claim 5 wherein the radially upstanding flanges include at least one inwardly extending projection and the tape includes at least one notch at each marginal side portion positioned to correspond to the inwardly extending projections.

References Cited

UNITED STATES PATENTS

| | | | |
|---|---|---|---|
| 612,844 | 10/1898 | Headly | 24—10 |
| 1,164,697 | 12/1915 | Alsop | 24—10 |
| 1,749,207 | 3/1930 | Blair | 24—10 |
| 2,644,212 | 7/1953 | Markowitz | 24—11 X |
| 3,128,514 | 4/1964 | Parker | 24—11 |
| 3,159,372 | 12/1964 | McIntosh | 248—206 |

FOREIGN PATENTS 1,101,728  4/1955  France.

BERNARD A. GELAK, *Primary Examiner.*

JAMES L. LONG, Jr., *Examiner.*